(12) United States Patent
Khawand et al.

(10) Patent No.: US 7,047,050 B1
(45) Date of Patent: May 16, 2006

(54) METHOD OF MONITORING A BROADCAST CHANNEL FOR A PAGE AT A MOBILE COMMUNICATION DEVICE

(75) Inventors: Charbel Khawand, Miami, FL (US); Chin Pan Wong, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 395 days.

(21) Appl. No.: 10/082,006

(22) Filed: Feb. 23, 2002

(51) Int. Cl.
*H04B 17/00* (2006.01)
*H04Q 7/20* (2006.01)

(52) U.S. Cl. .................................. 455/574; 455/67.11
(58) Field of Classification Search ............... 455/574, 455/434, 458, 9, 67.11, 127.1, 127.5, 343.5
See application file for complete search history.

(56) References Cited

U.S. PATENT DOCUMENTS 5,884,196 A * 3/1999 Lekven et al. ............... 455/574
6,240,288 B1   5/2001 Wan et al.
6,295,311 B1 * 9/2001 Sun ............................ 375/147
6,560,453 B1 * 5/2003 Henry et al. ............. 455/67.11
6,628,972 B1 * 9/2003 Lee ............................ 455/574

FOREIGN PATENT DOCUMENTS

| WO | WO 00/24157 | 4/2000 |
| WO | WO 00/24208 | 4/2000 |
| WO | WO 00/28686 | 5/2000 |

* cited by examiner

*Primary Examiner*—Erika A. Gary
(74) *Attorney, Agent, or Firm*—Scott M. Garrett

(57) ABSTRACT

A mobile communication device (102) receives information in a broadcast control channel (108) including a page message (108). The mobile communication device measures certain parameters (210) of the control channel, such as received signal strength, channel quality, and the present automatic gain setting. These parameters are scored and weighted (300) to produce a signal quality metric (314) to determine the duration of time the mobile communication device can remain in a low power state to conserve battery charge before checking for page alert message in the broadcast control channel next.

7 Claims, 2 Drawing Sheets

METHOD OF MONITORING A BROADCAST CHANNEL FOR A PAGE AT A MOBILE COMMUNICATION DEVICE

TECHNICAL FIELD

This invention relates in general to mobile communication devices, and more particularly to methods of reducing power consumption in mobile communication devices.

BACKGROUND OF THE INVENTION

Mobile communication devices have become widespread in metropolitan areas throughout the world. There are a variety of types of mobile communication devices, most of which are generally referred to as cell or cellular phones. There are a number of different well-known air interfaces and protocols used to provide communication service, and the advantages of each are promoted by service providers in the marketplace. However, of equal or more concern to the users are the size and weight of the mobile communication device. Therefore manufactures have continued to reduce both the size and weight of such devices. One of the largest and heaviest components in any mobile communication device is the battery. This presents a problem because, in addition to size and weight, users are also interested in operation time without having to recharge or change a battery, and while a larger battery permits longer operation time, it increases the effective size and weight of the mobile communication device. Some advances in battery technology have allowed for smaller batteries compared to earlier batteries of equal energy capacity. However the use of smaller batteries has largely been made possible by reducing the power consumption of the mobile communication device, thereby allowing use of a smaller battery for equal operation time.

The push for lower power consumption has led to many innovative approaches to designing mobile communication devices, and manufactures continue to seek ways to reduce power consumption. Such efforts have led to lower voltage semiconductor devices, integration of sub-circuits formerly implemented with discrete components into monolithic packages, and other circuit level advance. At the same time, control of the various circuits through software has led to many advances in reducing power consumption. However, one area that hasn't been as intensively investigated is the air interface. This is because the mobile communication device is required to comply with the air interface for events such as, for example, receiving incoming call page alerts. Page alerts are messages sent over a broadcast channel to alert a given mobile communication device that there is an incoming call. When the mobile communication device receives the page alert, it can alert the user of the mobile communication device accordingly, and the user can then commence communicating.

Because a page alert can occur randomly, the mobile communication device needs to regularly check for page alert and other messages. Typically the mobile communication device checks the air interface at regular intervals by receiving messages transmitted over a broadcast channel. If it receives a page alert with the appropriate identification information indicating an incoming call for the particular mobile communication device, the mobile communication device takes appropriate action to receive the call. However, the mobile communication device doesn't need to constantly receive information, and in fact doing so would substantially shorten the battery life due to the higher power consumption compared to an idle mode. Most mobile communication devices go into a low power mode typically referred to as a "sleep" mode when not actively receiving or transmitting, and periodically wake up to check the broadcast channel for incoming messages. The interval between these checks is fixed, and based on a worst case signal quality.

Even though the mobile communication device only periodically wakes up to check the broadcast messages, there is a still a significant amount of power consumption associated with this activity. Therefore there is a need to further reduce power consumption without significantly degrading the ability to receive incoming page alerts and other messages.

DETAILED DESCRIPTION OF A PREFERRED EMBODIMENT

Figure 1:
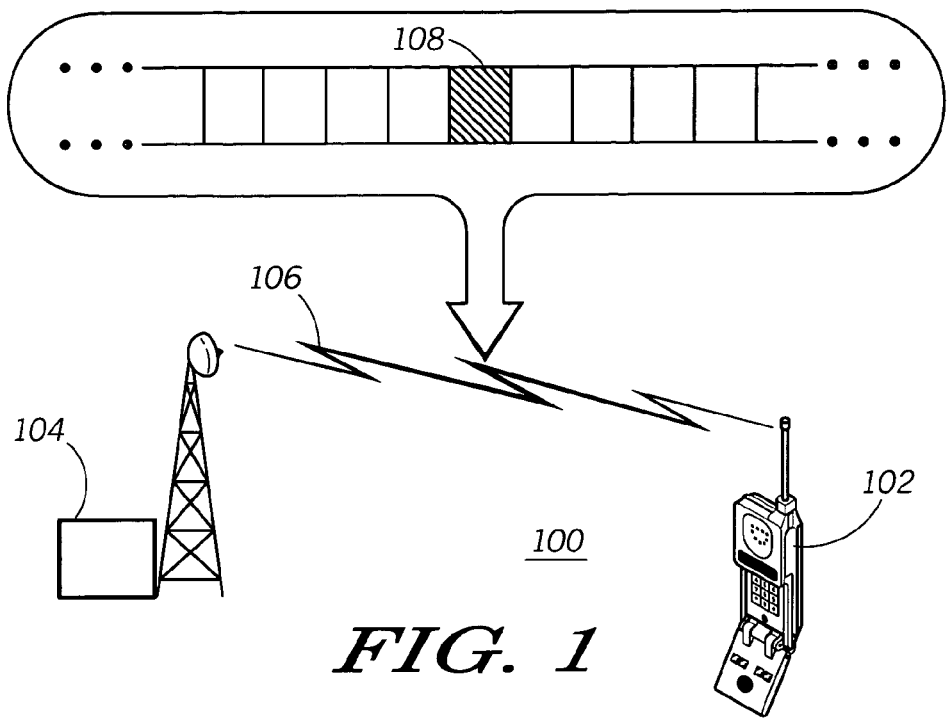
FIG. 1 shows a communication control channel in a communication system, in accordance with the invention.

While the specification concludes with claims defining the features of the invention that are regarded as novel, it is believed that the invention will be better understood from a consideration of the following description in conjunction with the drawing figures, in which like reference numerals are carried forward. A brief description of the prior art is also thought to be useful.

The invention provides for a means by which the mobile communication device can remain in a sleep mode and increase the time between intervals when checking for incoming page alert and other messages. In time division multiple access (TDMA) communication systems, the mobile communication devices are assigned to page groups, and have assigned receive slots where incoming messages are broadcast. When the time slot occurs, the mobile communication device receives and decodes the page block. This is easier to do under optimum signal conditions than under poor signal conditions. Because of varying signal quality of the broadcast signal, the interval selected is conventionally selected to allow the mobile communication device to decode the paging information under poor signal conditions. However, it has been found that under good signal conditions, there is very little chance the mobile communication device will not be able to decode the paging information. Therefore the invention provides for a method of determining the signal quality, and subsequently determining an interval duration based on the signal quality between page checks. This method allows the mobile communication device to remain in a low power mode longer under good signal conditions, thus conserving energy and extending battery life, but without sacrificing operating effectiveness under low quality signal conditions.

Referring now to FIG. 1, there is shown a system diagram of a typical communication system 100 including a mobile communication device 102 in accordance with the invention. The mobile communication device 102 receives signals from a base station 104 over an air interface, as is known in the art, including a broadcast control channel 106. The air interface shown here uses a timed division multiple access (TDMA) scheme, but may be any type of radio communication signal including, for example, code division multiple access (CDMA). The broadcast control channel in the present example is divided into time slots, which are typically numbered in a recurring fashion, as is known in the art. Page alert messages 108 are carried in the broadcast control channel. For a given mobile communication device presently being served by the base station 104, a particular recurring time slot is assigned to the mobile communication device for broadcasting page alert messages, if any exist. The mobile communication device receives the broadcast control channel during its assigned time slot, and decodes the message. Page alert messages are repeated by the base station in case the mobile communication device misses it, which is not uncommon, especially when the mobile communication device is near the edge of a serving area and the signal is weak. If the phone is idle, meaning it is not actively engaged in a call, to save power, the device typically turns off various sub-circuits. However, it maintains a timer so that it can "wake up" and check its assigned page slot in the broadcast control channel.

It has been found that as the signal quality of the broadcast control channel decreases, the probability the mobile communication device will not properly decode a page alert increases. This is why, as mentioned above, page alerts are repeated, often numerous times over periods lasting as long as 6 seconds or more. However, it has been found that under good signal conditions, where the signal quality is relatively high, the probability the mobile communication device will miss or not properly decode a page message is virtually zero.

In capitalizing on the reduced probability of missing a page alert under good signal condition, the invention uses a signal quality metric, which is the result of evaluating one or more channel parameters. The channel parameters used include received signal strength, the gain setting of any automatic gain control circuitry in the receiver portion of the mobile communication device circuitry, a correlation value of the broadcast signal, frequency correction settings, system loading, bit error rate, frequency of page alert repetition, and so on. All of these are parameters which affect the ability of the mobile communication device to decode the page alert messages broadcast over the broadcast control channel, and contribute to the signal quality metric determination.

Figure 2:
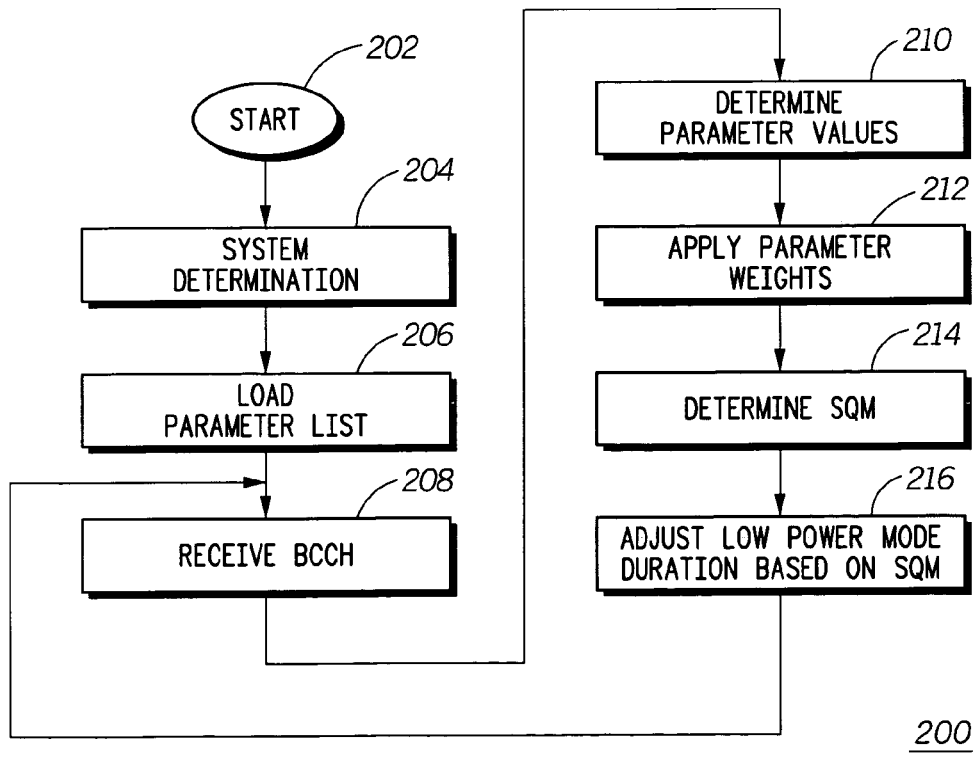
FIG. 2 shows a flow chart diagram of a method of monitoring a broadcast channel for a page at a mobile communication device, in accordance with the invention.

Referring now to FIG. 2, there is shown a flow chart diagram 200 of a method for monitoring a broadcast channel for a page at a mobile communication device, in accordance with the invention. At the start 202 the mobile communication device is turned on and registers for service in a typical fashion. Since the mobile communication device may operate in more than one system having more than one type of air interface, the mobile communication device makes a system determination 204 to identify the presently elected system. The mobile communication device then loads a parameter list 206 after making the system determination. The parameter list is a list of parameters selected by the manufacturer for determining the signal quality metric of received signals. The list merely specifies which parameters to monitor or track. These may be selected by routine experimentation for the particular air interface and for certain conditions. If the mobile communication device only operates with one air interface, the parameter list may be set, so there is no need to load a parameter list. Upon initializing the mobile communication device for receiving calls, the mobile communication device tunes to the broadcast control channel (BCCH) (208) and receives control information. In the process of receiving the control information, the mobile communication device will determine the parameter values (210). For example, the mobile communication device will determine the received signal strength, the automatic gain settings, the frequency band of the BCCH, and other parameters. Once these parameters have been determined, as occurs normally in receiving control information, the mobile communication device evaluates them. In the preferred embodiment the mobile communication device weights the different parameters, or otherwise determines a "score" corresponding to the value of each parameter (212). From the weights or score, a signal quality metric is determined. The signal quality metric determination results in a numeric value or score which is then used to select the duration of a low power period before the mobile communication device needs to check the BCCH for paging information again (216). There are a number of ways this determination may be made. For example, the signal quality metric can be compared to a preselected threshold, and if such comparison indicates the signal quality is sufficient that the probability of missing a page is low enough, the mobile communication device can select a period to of number of paging intervals to remain in a low power mode so as to conserve battery energy.

Typically, the page alert messages broadcast on the BCCH are repeated at regular intervals for a period of time on the order of a few seconds. The rate at which the page alert message is repeated is typically multiple times per second, if not substantially more. The rate at which a typical mobile communication device leaves low power mode to receive the BCCH and check for page alert messages is also on the order of multiple times per second. By use of the invention, however, under appropriate signal conditions, as determined in accordance with the invention, the mobile communication device can remain in a low power mode longer with little risk of missing a page alert message.

Figure 3:
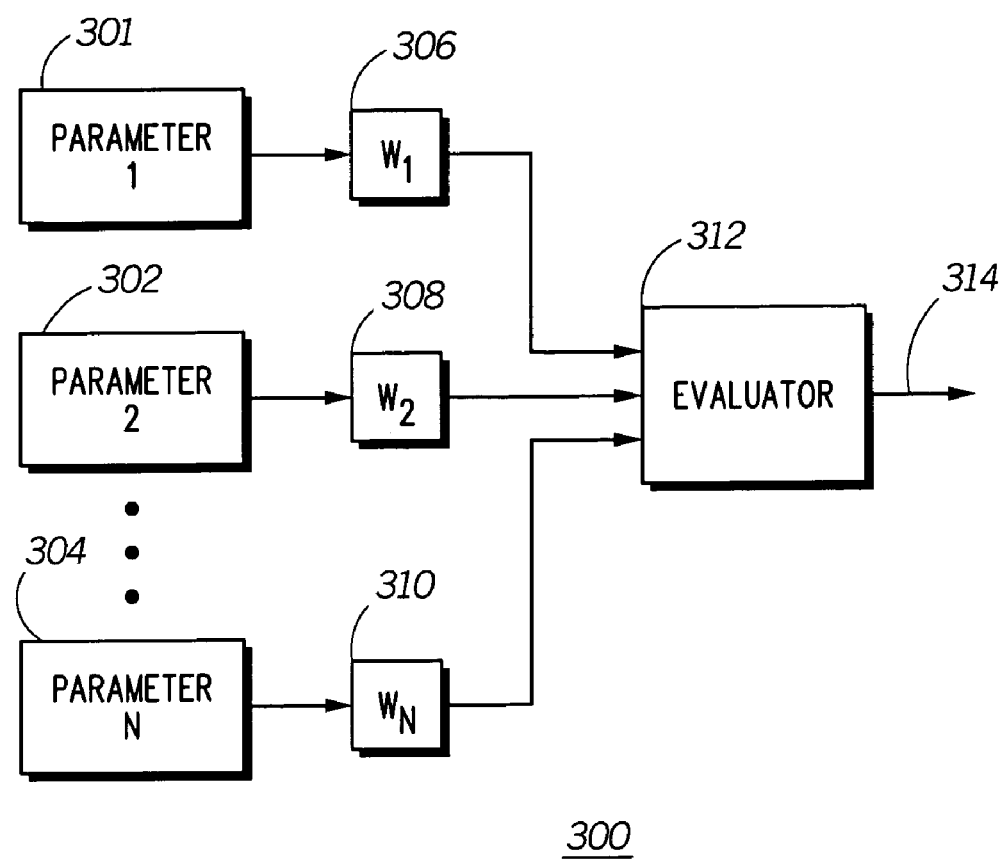
FIG. 3 shows a process diagram of a method of weighting signal and system parameters to produce a signal quality metric, in accordance with the invention.

Referring now to FIG. 3, there is shown a process diagram 300 of a method of weighting signal and system parameters to produce a signal quality metric, in accordance with the invention. Once the mobile communication device receives a broadcast signal, it calculates the value of whatever parameters are loaded or otherwise identified as pertinent. These values are stored in memory, in locations such as parameter 1, parameter 2 to parameter n, 301, 302, 304, respectively. These parameters will typically include, for example, received signal strength, and signal or channel quality estimation. It is expected that channel quality will be the most heavily weighted parameter. Each parameter is then weighted by a scaling factor, for example, 306, 308, and 310 corresponding with parameter's 1, 2, n, respectively. The weighted parameters are evaluated by an evaluator, represented by block 312. In the preferred embodiment, the evaluator is simply an algorithm that sums the weighted parameters and determines if it exceeds a preselected threshold. The output 314 of the evaluator is a signal metric, and allows the mobile communication device to determine when it should next check for a page alert in the broadcast control channel. In general, the better the conditions are for receiving the broadcast signal and correctly decoding page alert messages, the longer the mobile communication device can go without checking the broadcast control channel, and thus remain in a low power mode, conserving battery charge.

Thus, the invention provides a rule based system and method determining the duration of time between checking the broadcast control channel for page alert messages. When the signal is strong and the conditions indicate a high probability of correctly decoding page messages, the duration will be set higher so as to reduce the frequency of checking the broadcast channel and conserve battery power. The invention provides a method of monitoring a broadcast channel for a page at a mobile communication device, which commences by receiving a broadcast signal in the broadcast channel to check for the page. Receiving the broadcast signal includes performing routine measurements such as received signal strength, automatic gain settings, and so on. Upon performing these measurements and settings, the mobile communication device commences determining a signal quality metric upon receiving the broadcast signal. The signal quality metric is produced by having selected several parameters indicative of the ability of the mobile communication device to correctly decode a page message under the present signal conditions. The selected parameters are scored and weighted in proportion to their effect on, or their indication of the signal conditions to produce the signal quality metric. The signal quality is then used by the mobile communication device for selecting a time period for the mobile communication device to remain in a low power mode. Under good to excellent signal conditions, the mobile communication device will remain in low power mode for a longer duration than when the signal condition is poor. Once the time period has been selected, and the mobile communication device has been in a low power mode for that duration of time, the mobile communication device repeats the process by receiving the broadcast again to check for the page only after the time period has passed. The low power mode is characterized by the mobile communication device having a lower rate of power consumption than when receiving the broadcast signal.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of monitoring a broadcast channel for a page at a mobile communication device, comprising:

receiving a broadcast signal in the broadcast channel to check for the page;

calculating the values of a plurality of channel parameters;

weighting each of the values of the plurality of channel parameters by applying a scaling factor to provide weighted values;

determining a signal quality metric by summing the weighted values;

selecting a time period based on the signal quality metric; and receiving the broadcast again to check for the page only after the time period has passed.

2. A method of monitoring a broadcast channel as defined in claim 1, further comprising placing the mobile communication device into a low power mode between the selecting and receiving the broadcast signal again, the low power mode being characterized by the mobile communication device having a lower rate of power consumption than when receiving the broadcast signal.

3. A method of monitoring a broadcast channel as defined in claim 1, wherein the signal quality metric is determined, at least in part, by the received signal strength.

4. A method of monitoring a broadcast channel as defined in claim 1, wherein the signal quality metric is determined, at least in part, by an automatic gain control setting of a receiver of the mobile communication device.

5. A method of monitoring a broadcast channel as defined in claim 1, wherein the signal quality metric is determined by weighting at least two channel parameters selected from the group consisting of received signal strength of the broadcast signal, automatic gain control setting of a receiver of the mobile communication device, and a correlation value of the broadcast signal.

6. A method of monitoring a broadcast channel as defined in claim 1, wherein if the signal quality metric is below a preselected threshold, the selecting the time period comprises selecting a default time period.

7. A method of monitoring a broadcast channel as defined in claim 1, wherein the selecting the time period based on the signal quality metric comprises selecting the time period in terms of a number of time slots, the time slots defined by an air interface used by the mobile communication device.

* * * * *